(12) United States Patent
Hasegawa et al.

(10) Patent No.: US 10,093,131 B2
(45) Date of Patent: Oct. 9, 2018

(54) TIRE

(71) Applicant: BRIDGESTONE CORPORATION, Chuo-ku, Tokyo (JP)

(72) Inventors: Tomoo Hasegawa, Tachikawa (JP); Fumihiro Nomura, Higashimurayama (JP); Yosuke Mori, Kawasaki (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 275 days.

(21) Appl. No.: 14/391,342

(22) PCT Filed: Apr. 16, 2013

(86) PCT No.: PCT/JP2013/061285
§ 371 (c)(1),
(2) Date: Oct. 8, 2014

(87) PCT Pub. No.: WO2013/157544
PCT Pub. Date: Oct. 24, 2013

(65) Prior Publication Data
US 2015/0107741 A1    Apr. 23, 2015

(30) Foreign Application Priority Data

Apr. 16, 2012  (JP) ................................. 2012-093008
Apr. 16, 2012  (JP) ................................. 2012-093094

(51) Int. Cl.
*B60C 11/11*    (2006.01)
*B60C 11/03*    (2006.01)
*B60C 11/12*    (2006.01)

(52) U.S. Cl.
CPC ....... *B60C 11/0311* (2013.01); *B60C 11/0306* (2013.01); *B60C 11/1259* (2013.01);
(Continued)

(58) Field of Classification Search
CPC ............ B60C 11/0311; B60C 11/0306; B60C 2011/0367; B60C 2011/0372;
(Continued)

(56) References Cited

U.S. PATENT DOCUMENTS 3,175,598 A * 3/1965 Cegnar ..................... B60C 9/20
152/535
D220,605 S * 4/1971 Hoke ........................... D12/561
(Continued)

FOREIGN PATENT DOCUMENTS

DE        10311430 A1 *  9/2004
EP        2 230 104 A1    9/2010
(Continued)

OTHER PUBLICATIONS

Machine translatuion for Japan 2008-013037 (no date).*
(Continued)

*Primary Examiner* — Steven D Maki
(74) *Attorney, Agent, or Firm* — Sughrue Mion, PLLC

(57) ABSTRACT

A tire 1 includes plural land portions 40 formed on a tread portion 10. The plural land portions 40 are segmented by a circumferential direction groove 30 extending in a tire circumferential direction L and a width direction groove 20, or segmented by an end portion 10E of the tread portion 10 in the tire width direction W and the width direction groove 20. A length of the width direction groove 20 in the tire width direction W is not less than 30% of a length of the tread portion 10 in the tire width direction W. The width direction groove 20 has at least one angled portion 50A/50B configured to be bent toward an opposite direction to a tire rotational direction R on at least one side of a tire equator line CL.

7 Claims, 12 Drawing Sheets

(52) U.S. Cl.
CPC ..... *B60C 11/0302* (2013.01); *B60C 2011/036* (2013.01); *B60C 2011/0313* (2013.01); *B60C 2011/0348* (2013.01); *B60C 2011/0367* (2013.01); *B60C 2011/0369* (2013.01); *B60C 2011/0372* (2013.01); *B60C 2200/06* (2013.01); *B60C 2200/065* (2013.01)

(58) Field of Classification Search
CPC ....... B60C 2011/036; B60C 2011/0348; B60C 11/0302; B60C 2011/0313; B60C 2011/0369; B60C 11/11
See application file for complete search history.

(56) References Cited

U.S. PATENT DOCUMENTS

| | | | | |
|---|---|---|---|---|
| 3,896,869 | A | * | 7/1975 | Fujishima ............. B60C 9/2009 152/527 |
| 4,823,855 | A | * | 4/1989 | Goergen ............. B60C 11/0302 152/209.18 |
| 5,058,643 | A | * | 10/1991 | Nakasaki ................ B60C 11/13 152/209.16 |
| 6,481,480 | B1 | * | 11/2002 | Schuster ................. B60C 11/11 152/209.18 |
| 6,601,623 | B1 | * | 8/2003 | Katayama ............... B60C 11/12 152/209.15 |
| 8,006,729 | B2 | | 8/2011 | Ebiko |
| D722,013 | S | * | 2/2015 | Hironaka .................... D12/564 |
| 2007/0012389 | A1 | * | 1/2007 | Ito ...................... B60C 11/0306 152/209.22 |
| 2009/0101259 | A1 | | 4/2009 | Ebiko |
| 2010/0236681 | A1 | * | 9/2010 | Beha .................. B60C 11/0306 152/209.18 |

FOREIGN PATENT DOCUMENTS

| | | | |
|---|---|---|---|
| JP | 59-26306 | A | 2/1984 |
| JP | 61-071203 | A * | 4/1986 |
| JP | 2-127104 | A | 5/1990 |
| JP | 06-191232 | A * | 7/1994 |
| JP | 07-063658 | A | 3/1995 |
| JP | 09-226323 | A * | 9/1997 |
| JP | 2002-337513 | A | 11/2002 |
| JP | 2003-136911 | A * | 5/2003 |
| JP | 2004-224131 | A | 8/2004 |
| JP | 2005-112030 | A | 4/2005 |
| JP | 2005-238995 | A | 9/2005 |
| JP | 2006-160216 | A * | 6/2006 |
| JP | 2006-341792 | A | 12/2006 |
| JP | 2008-013037 | A * | 1/2008 |
| JP | 2008-062706 | A | 3/2008 |
| JP | 4628080 | B2 | 2/2011 |
| JP | 4677307 | B2 | 4/2011 |
| RU | 2424911 | C1 | 7/2011 |

OTHER PUBLICATIONS

Machine translation for Japan 2003-136911 (no date).*
Machine translation for Japan 09-226323 (no date).*
Machine translation for Japan 06-191232 (no date).*
Machine translation for German 10311430 (no date).*
Machine translation for Japan 2006-160216 (Year: 2018).*
Communication dated Feb. 26, 2016 from the Russian Patent Office issued in corresponding Application No. 2014145831.
Communication dated Jul. 30, 2015, issued by the European Patent Office in corresponding European Application No. 13777967.4.
Communication dated Sep. 15, 2015, issued by the Japan Patent Office in corresponding Japanese Application No. 2012-093008.
International Search Report of PCT/JP2013/061285 dated Jun. 4, 2013.

* cited by examiner

FIG. 11
(a) A-A' CROSS-SECTIONAL VIEW
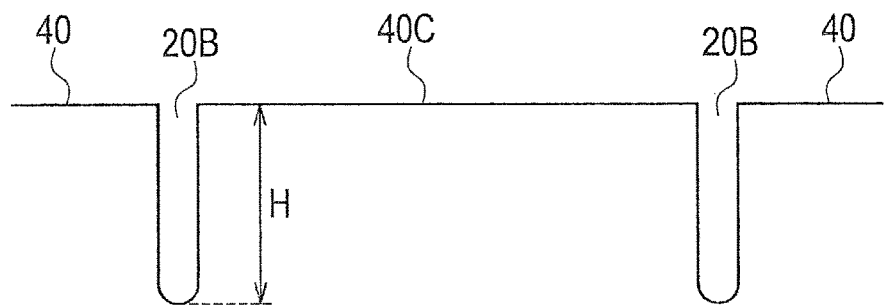
(b) B-B' CROSS-SECTIONAL VIEW
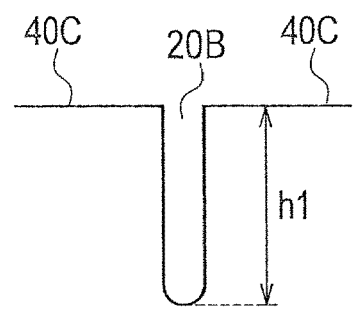
(c) D-D' CROSS-SECTIONAL VIEW
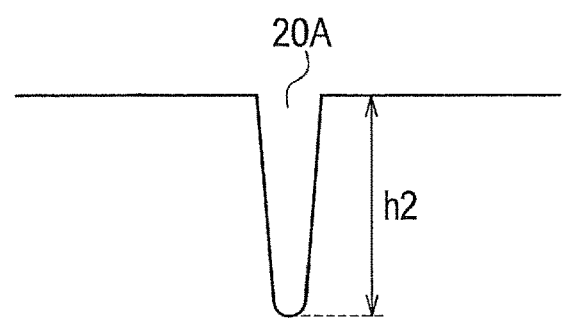

TIRE

CROSS REFERENCE TO RELATED APPLICATIONS

This is a National Stage of International Application No. PCT/JP2013/061285 filed Apr. 16, 2013, claiming priority based on Japanese Patent Application No. 2012-093008 filed Apr. 16, 2012 and Japanese Patent Application No. 2012-093094 filed Apr. 16, 2012, the contents of all of which are incorporated herein by reference in their entirety.

TECHNICAL FIELD

The present invention relates to a tire.

BACKGROUND ART

Conventionally, as shown in FIG. 1, there is known a heavy load tire that has, in its tread portion 10, a protection belt ply 11 composed of two sheets of protection belts 11A/11B, a main crossed belt ply 12 composed of two sheets of main crossed belts 12A/12B, and a small crossed belt ply 13 composed of two sheets of small crossed belts 13A/13B (for example, see Patent Documents 1 and 2).

As shown in FIG. 1, in the tire 1, the main crossed belt ply 12 is disposed on an outer side of the small crossed belt ply 13 in a tire radial direction, and the protection belt ply 11 is disposed on an outer side of the main crossed belt ply 12 in the tire radial direction.

For example, in the tire 1, an angle between cords constructing the small crossed belt ply 13 and a tire circumferential direction L is 4-10°, an angle between cords constructing the main crossed belt ply 12 and the tire circumferential direction L is 18-35°, and an angle between cords constructing the protection belt ply 11 and the tire circumferential direction L is 22-33°.

Therefore, in the tread portion 10 of the tire 1, an area near a tire equator line CL (a central area) has smaller angles formed between cords constructing the belt ply and the tire circumferential direction L than an area near an end portion in a tire width direction W (a shoulder area).

In the above-explained tire 1, a belt tension becomes small in the area having a large angle between cords constructing the belt ply and the tire circumferential direction L, so that the area contracts greatly along the tire circumferential direction L.

As a result, when the tire 1 rotates, the area near the end portion in the tire width direction W contracts greatly along the tire circumferential direction L, so that a length, along the tire circumferential direction L, of the area near the tire equator line CL becomes longer than a length, along the tire circumferential direction L, of the area near the end portion in the tire width direction W.

Therefore, when the tire 1 rotates, a force in a tire rotational direction (driving force) is generated in the area near the tire equator line CL and a force in an opposite direction to the tire rotational direction (braking force) is generated in the area near the end portion in the tire width direction W, so that a shearing force is generated near the boundary of the both areas.

Further, in a case where a load is applied to the tire 1 after an inner pressure is added to it, a shearing force is generated near the boundary of the both areas, because degrees of deformations along the tire radial direction are different between the area near the tire equator line CL and the area near the end portion in the tire width direction W.

Especially, a force in the tire width direction W is added due to a steered angle in a case where the tire 1 is installed onto a steered axle, and the shearing force is made much larger by the applied breaking force in a case where the tire is installed onto an axle to which a breaking force is applied.

The above phenomena are particularly accentuated in the heavy load tire 1 that is constituted so that a length of a land portion(s) along the tire width direction W is not smaller than 30% of a length of the tread portion 10 along the tire width direction W.

PRIOR ART DOCUMENT

Patent Document

Patent Document 1: Japanese Granted Patent NO. 4677307

Patent Document 2: Japanese Granted Patent NO. 4628080

SUMMARY OF INVENTION

A tire according to a first aspect includes a plurality of land portions formed on a tread portion. The plurality of land portions is segmented by a circumferential direction groove extending in a tire circumferential direction and a width direction groove extending in a tire width direction, or segmented by an end portion of the tread portion in the tire width direction and the width direction groove. A length of the width direction groove in the tire width direction is not less than 30% of a length of the tread portion in the tire width direction. The width direction groove has at least one angled portion configured to be bent toward an opposite direction to a tire rotational direction on at least one side of a tire equator line.

In the first aspect, the circumferential direction groove includes a central circumferential direction groove extending on the tire equator line along the tire circumferential direction. The width direction groove having the angled portion extends from the end portion of the tread portion in the tire width direction to the central circumferential direction groove.

In the first aspect, the plurality of land portions includes central land portions that are formed in a tread center area including the tire equator line as a center in the tire width direction. The tread center area has a width that is not larger than 40% of the length of the tread portion in the tire width direction. A ratio P/H of a length P of the central land portions in the tire circumferential direction and a height H of the central land portions in a tire radial direction is not smaller than 2 and not larger than 3.5.

In the first aspect, the width direction groove includes a first groove extending from the end portion of the tread portion in the tire width direction toward an inside of the tire width direction, and a second groove formed in at least part of the tread center area. A depth h1 of the second groove in the tire radial direction is not larger than 80% of a depth h2 of the first groove in the tire radial direction.

In the first aspect, the tire includes a plurality of belt plies. The at least one angled portion is disposed near a tire width direction position that is associated with an end portion of a belt ply that has the smallest angle between cords constructing the belt ply and the tire circumferential direction.

In the first aspect, the width direction groove has at least two angled portions on at least one side of the tire equator line. The width direction groove has a flat portion that is formed so as to be almost parallel to the tire width direction between the two angled portions.

In the first aspect, a circumferential direction narrow groove that intersects with the flat portion and extends along the tire circumferential direction is provided.

BRIEF DESCRIPTIONS OF DRAWINGS

FIG. 11($a$) is a cross-sectional view showing a height of a land portion segmented by width direction grooves 20 (second grooves 20B), FIG. 11($b$) is a cross-sectional view showing a depth of the second groove 20B, and FIG. 11($c$) is a cross-sectional view showing a depth of a first groove 20A.

DESCRIPTION OF EMBODIMENTS

First Embodiment

A tire 1 according to a first embodiment will be explained with reference to FIG. 1 to FIG. 4.

Figure 1:
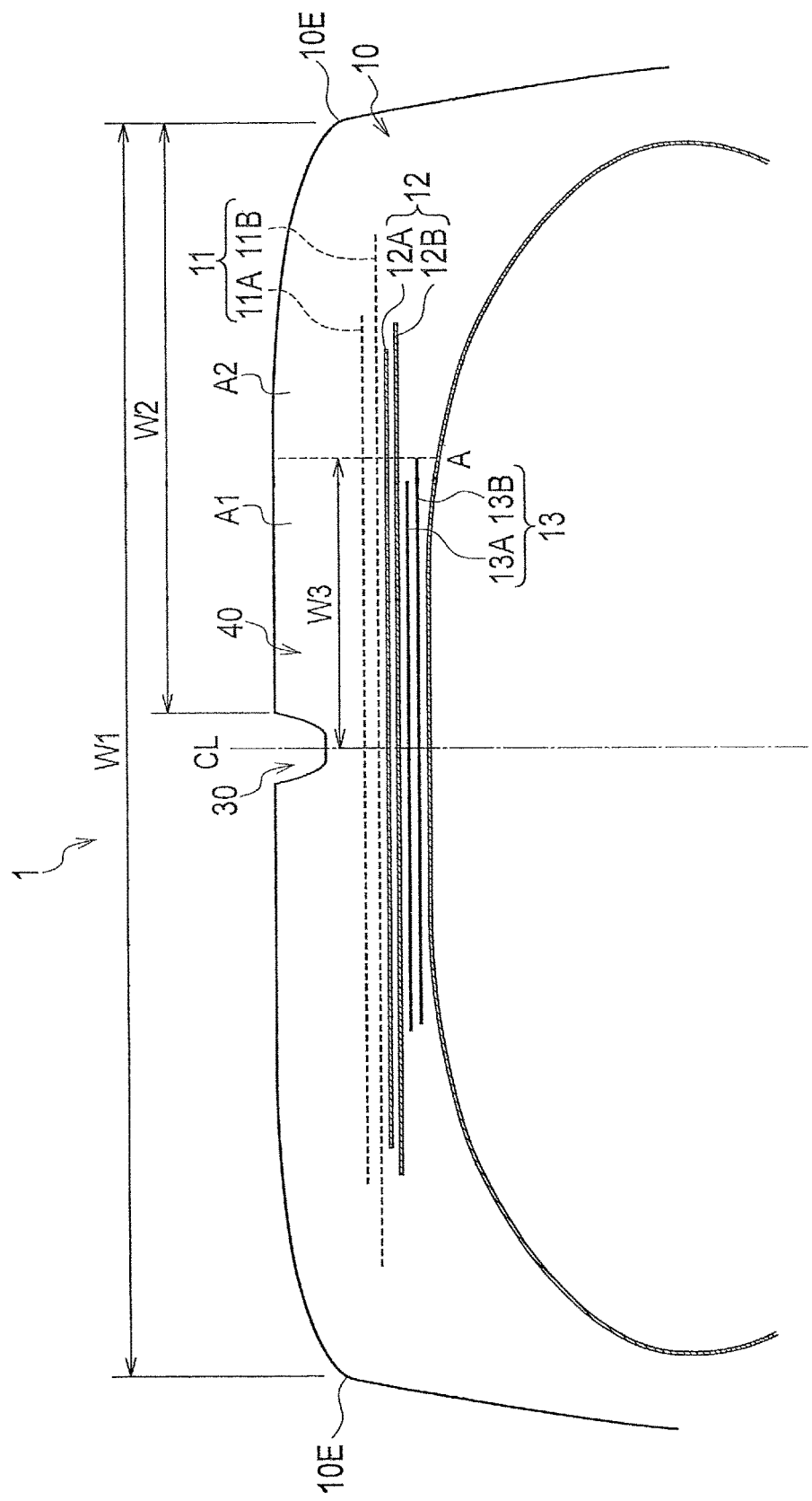
FIG. 1 is a cross-sectional view of a tire according to a first embodiment taken perpendicularly to a tire circumferential direction along a tire radial direction.
Figure 3:
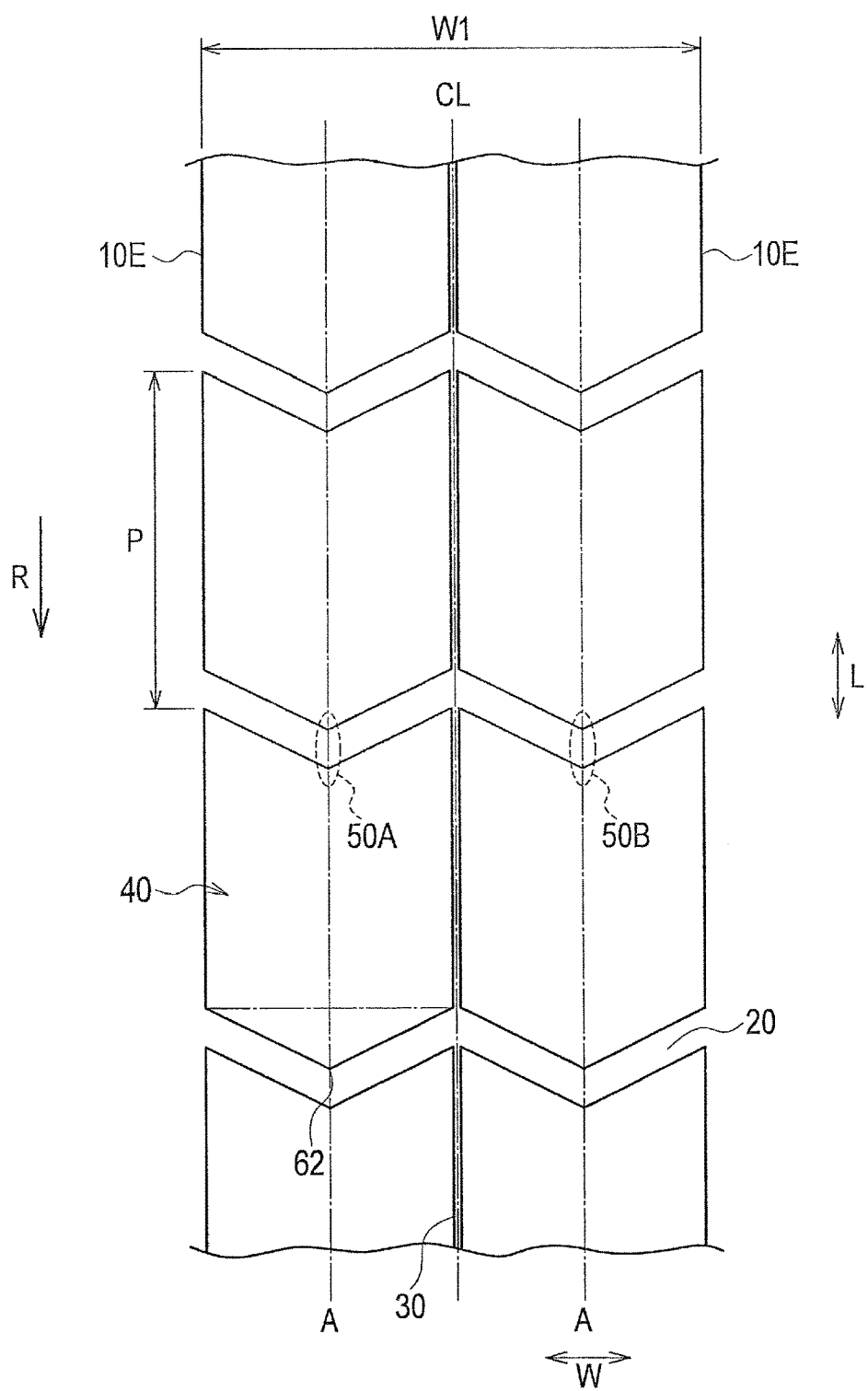
FIG. 3 is a plan view of a part of a tread surface of the tire according to the first embodiment.

FIG. 1 shows a cross-sectional view of a tire according to a first embodiment taken perpendicularly to a tire circumferential direction along a tire radial direction, and FIG. 3 shows a plan view of a part of a tread surface of the tire according to the first embodiment.

Although a heavy load tire 1 will be explained as one example of the tire 1 in the first embodiment, embodiments are not limited to such a tire.

As shown in FIG. 1, in the tire 1 according to the first embodiment, a length W2 of a land portion 40 along a tire width direction W is configured so as not to be smaller than 30% of a length W1 of a tread portion 10 along the tire width direction W.

In addition, the tire 1 according to the first embodiment includes plural belt plies. Specifically, as shown in FIG. 1 and FIG. 2, the tire 1 according to the first embodiment includes, in the tread portion 10, a protection belt ply 11 composed of two sheets of protection belts 11A/11B, a main crossed belt ply 12 composed of two sheets of main crossed belts 12A/12B, and a small crossed belt ply 13 composed of two sheets of small crossed belts 13A/13B.

Figure 2:
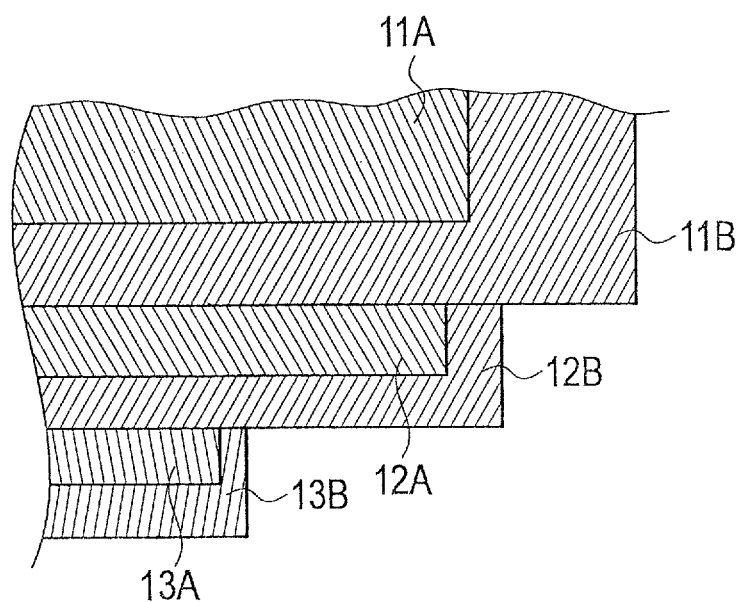
FIG. 2 is a diagram for explaining a configuration of belts in the tire according to the first embodiment.

As shown in FIG. 1 and FIG. 2, in the tire 1, the main crossed belt ply 12 is disposed on an outer side of the small crossed belt ply 13 in a tire radial direction, and the protection belt ply 11 is disposed on an outer side of the main crossed belt ply 12 in the tire radial direction.

For example, as shown in FIG. 2, in the tire 1, an angle between cords constructing the small crossed belt ply 13 and a tire circumferential direction L is 4-10°, an angle between cords constructing the main crossed belt ply 12 and the tire circumferential direction L is 18-35°, and an angle between cords constructing the protection crossed belt ply 11 and the tire circumferential direction L is 22-33°.

In addition, as shown in FIG. 3, the tire 1 according to the first embodiment has plural land portions 40 on the tread portion 10 that are segmented by a circumferential direction groove 30 extending along the tire circumferential direction L or end portions 10E of the tread portion 10 in the tire width direction W, and width direction grooves 20 extending along the tire width direction W. Here, it is preferable that the circumferential direction groove 30 is a central circumferential direction groove extending on the tire equator line CL along the tire circumferential direction.

Here, it is preferable, for example, that a groove width of the circumferential direction groove 30 is not larger than 10 mm and a width of the width direction groove(s) 20 is not larger than 50 mm. Note that one or more circumferential direction narrow grooves (sipes) (an after-explained circumferential direction narrow groove 70 shown in FIG. 8 and after-explained circumferential direction narrow grooves 70A and 70B shown in FIG. 10) each width of that is not larger than 50 mm may be formed on the land portions 40.

Note that a depth, along the tire radial direction, of the circumferential direction narrow groove(s) is shallower than a depth, along the tire radial direction, of the circumferential direction groove 30 and the width direction groove(s) 20.

Here, in view of wear performance, it is good that the width of the circumferential direction groove 30 (a length in the tire width direction W) is not larger than 10 mm, because the land portions 40 are supported by each other when forces are added to them.

On the other hand, in view of heat radiation performance, it is good that the width of the circumferential direction groove 30 (the length along the tire width direction W) is larger than 10 mm.

In addition, in the tire 1 according to the first embodiment, a length of the width direction groove 20 along the tire width direction W is configured so as not to be smaller than 30% of the length W1 of the tread portion 10 along the tire width direction W.

Further, in the tire 1 according to the first embodiment, a pitch P of the land portions 40 (the width direction grooves 20) may be configured so as not to be smaller than 50 mm.

In addition, in the tire 1 according to the first embodiment, as shown in FIG. 3, the width direction groove(s) 20 is configured so as to have at least one angled portion 50A/50B that is configured to be bent toward an opposite direction to a tire rotational direction R on at least one side of the tire equator line CL.

In the example shown in FIG. 3, the width direction groove(s) 20 has one angled portion 50A on a left side of the tire equator line CL, and has one angled portion 50B on a right side of the tire equator line CL.

Here, the width direction groove(s) 20 may have one angled portion 50A (or 50B) only on the left side (or the right side) of the tire equator line CL.

In addition, the width direction groove(s) 20 may be configured so as to have another angled portion(s) in addition to the two angled portions 50A/50B shown in FIG. 3.

In addition, all the width direction grooves 20 may be configured so as to have the above-explained angled portion(s), respectively, or only some of the width direction grooves 20 may be configured so as to have the above-explained angled portion(s).

Note that the width direction groove(s) 20 may be configured so as to be continued over the tire equator line CL, or configured so as to be discontinued at the tire equator line CL.

In the example shown in FIG. 3, the width direction groove(s) 20 continues over the tire equator line CL, and is configured so as to be bent toward the tire rotational direction R on the tire equator line CL.

Here, according to the above-explained angled portions 50A/50B, a gouged portion (depressed portion) is formed on a tread-trailing side of at least one of the land portions 40 disposed on both sides of the tire equator line CL.

In addition, according to the above-explained angled portions 50A/50B, a protruded portion (pointed portion) is formed on a tread-leading side of at least one of the land portions 40 disposed on both sides of the tire equator line CL.

Note that, as shown in FIG. 3, the tire 1 according to the first embodiment has a directional pattern that specifies the rotational direction R of the tire 1. Namely, in the tire 1 according to the first embodiment, an installation direction of the tire 1 onto a wheel is predetermined.

For example, in the tire 1 according to the first embodiment, the width direction groove(s) 20 bent at the angled portions 50A/50B may be, in a plan view of the tread surface, inclined at 0° to 80° to the tire circumferential direction L, and inclined at 0° to 80° to the tire width direction W.

Here, the inclined angle of the width direction groove(s) 20 to the tire width direction W may be configured to be shallow in areas near the end portions 10E in the tire width direction W on the tread surface.

In such a case, in the tire 1 according to the first embodiment, the land portion(s) 40 has an arrow-feathers shape in the plan view of the tread surface, as shown in FIG. 3.

In addition, in the tire 1 according to the first embodiment, as shown in FIG. 1 and FIG. 3, the angled portions 50A/50B may be disposed near tire width direction positions A that are associated with end portions of a belt ply that has the smallest angle between cords constructing the belt ply and the tire circumferential direction L (i.e. the small crossed belt ply 13).

Here, for example, the phrase "near tire width direction positions A" means areas within 1/3 of the width (length along the tire width direction W) of the land portion(s) 40 in the tire width direction W with centers distanced by 1/4 of the width (length along the tire width direction W) of the tire 1 from the end portions 10E in the tire width direction W on the tread surface.

For example, a length W3 along the tire width direction W between the position(s) A along the tire width direction and the tire equator line CL may be about 1/4 of the length W1 of the tread portion 10 along the tire width direction W.

With respect to the tread portion 10 of the tire 1 according to the first embodiment, an angle between the cords constructing each belt ply and the tire circumferential direction L in an area A2 on a side of an end of the tire width direction W from an end of the small crossed belt ply 13 is larger than that in an area A1 on a side of the tire equator line CL from the end of the small crossed belt ply 13.

Namely, in the tread portion 10 of the tire 1, a belt tensile force in the area A2 on the side of the end of the tire width direction W from the end of the small crossed belt ply 13 is smaller than that in the area A1 on the side of the tire equator line CL from the end of the small crossed belt ply 13.

As a result, in the tread portion 10 of the tire 1, the area A2 on the side of the end of the tire width direction W from the end of the small crossed belt ply 13 shrinks along the tire circumferential direction L further than the area A1 on the side of the tire equator line CL from the end of the small crossed belt ply 13, so that the length of the area A1 along the tire circumferential direction L becomes longer than the length of the area A1 along the tire circumferential direction L.

Therefore, when the tire 1 rotates, a force in the tire rotational direction R (driving force) is generated in the area A and a force in an opposite direction to the tire rotational direction R (breaking force) is generated, so that a shearing force is generated near the boundary of the area A1 and the area. A2 (i.e. in areas near the end portions of the small crossed belt ply 13).

Figure 4:
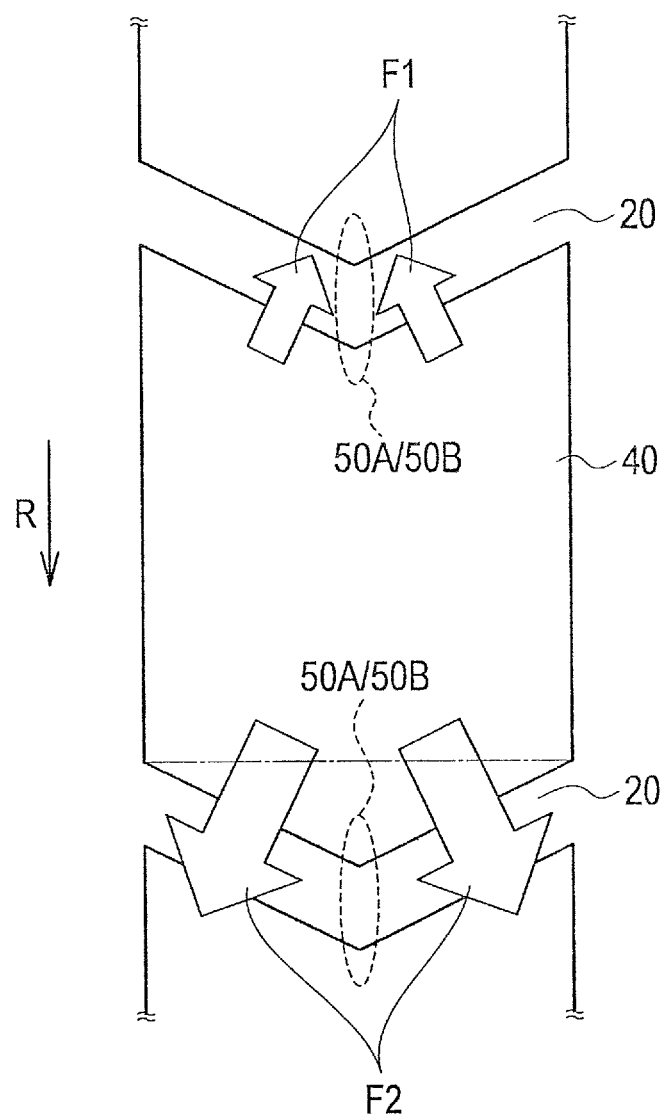
FIG. 4 is a diagram for explaining an effect brought by the tire according to the first embodiment.

Here, in the tire 1 according to the first embodiment, as shown in FIG. 4, the force F1 in the opposite direction to the tire rotational direction R (breaking force) that is generated in the land portion(s) 40 is made smaller by providing the above-explained angled portions 50A/50B than in a case where the angled portions 50A/50B are not provided.

As a result, the shearing force generated near the boundary of the area A1 and the area A2 (i.e. in areas near the end portions of the small crossed belt ply 13) can be reduced.

In addition, in the tire 1 according to the first embodiment, as shown in FIG. 4, the force F2 in the tire rotational direction R (driving force) that is generated in the land portion(s) 40 is made larger by providing the above-explained angled portions 50A/50B than in a case where the angled portions 50A/50B are not provided.

As a result, the shearing force generated near the boundary of the area A1 and the area A2 (i.e. in areas near the end portions of the small crossed belt ply 13) can be reduced.

Note that narrow grooves (sipes) and various types of grooves may be provided further in the tire 1 according to the first embodiment according to required performances.

Modified Example 1

Hereinafter, a tire 1 according to a modified example 1 of the first embodiment will be explained with reference to FIG. 5 by focusing on its differences from the above-explained tire according to the first embodiment.

Figure 5:
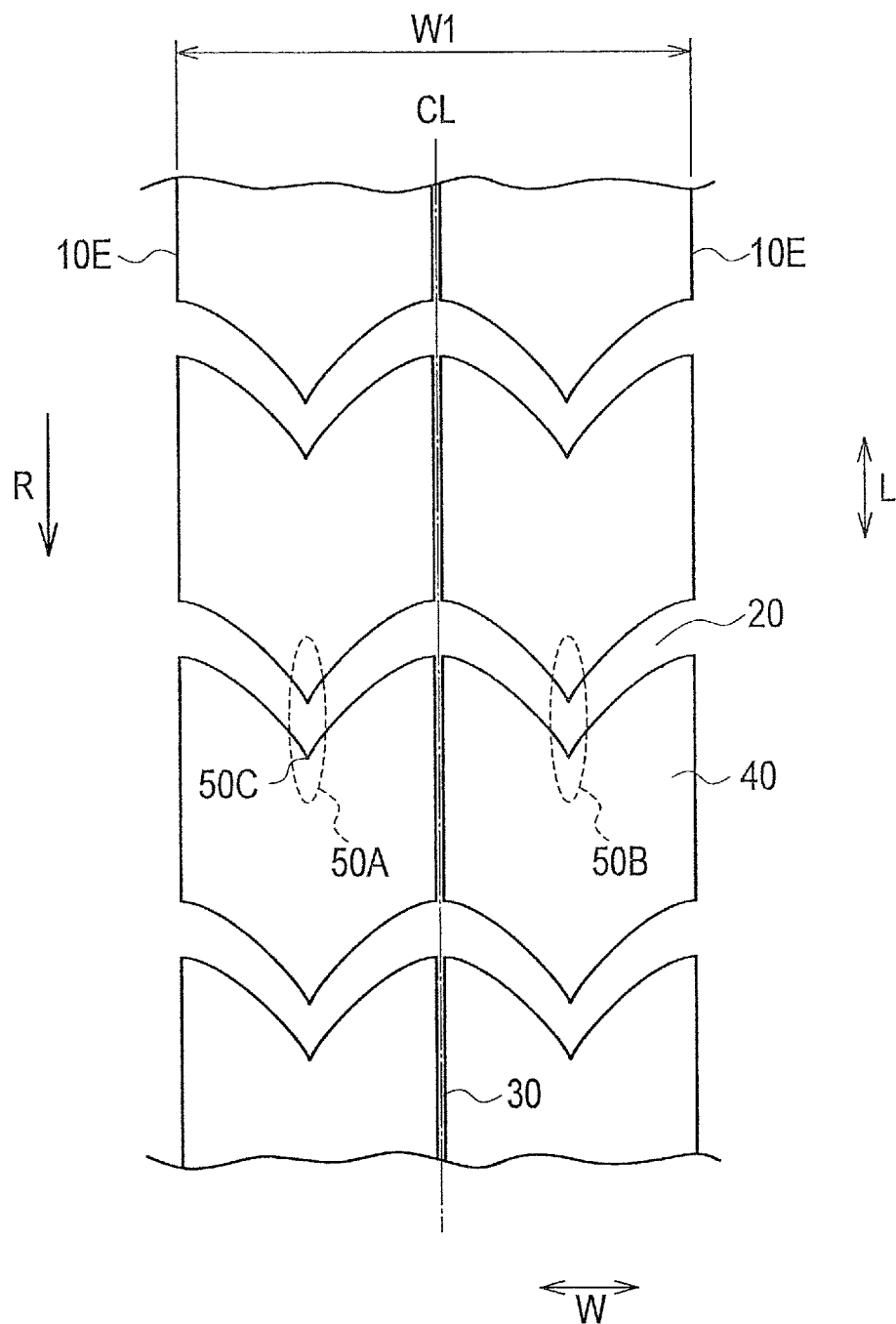
FIG. 5 is a plan view of a part of a tread surface of a tire according to a first modified example.

As shown in FIG. 5, in the tire 1 according to the present modified example 1, the width direction groove(s) 20 bent at the angled portions 50A/50B may be configured so as to be curved to present a curved-line shape.

According to the present modified example 1, an inclined angle of the width direction groove(s) 20 to the tire width direction W is configured so as to become large in areas peripheral to vertexes 50C of the angled portions 50A/50B and thereby a driving effect in the areas peripheral to the vertexes 50C of the angled portions 50A/50B becomes large, and an inclined angle of the width direction groove(s) 20 to the tire width direction W is configured so as to become small in areas other than the areas peripheral to vertexes 50C of the angled portions 50A/50B and thereby a braking effect can be dispersed in the areas other than the areas peripheral to the vertexes 50C.

Modified Example 2

Figure 6:
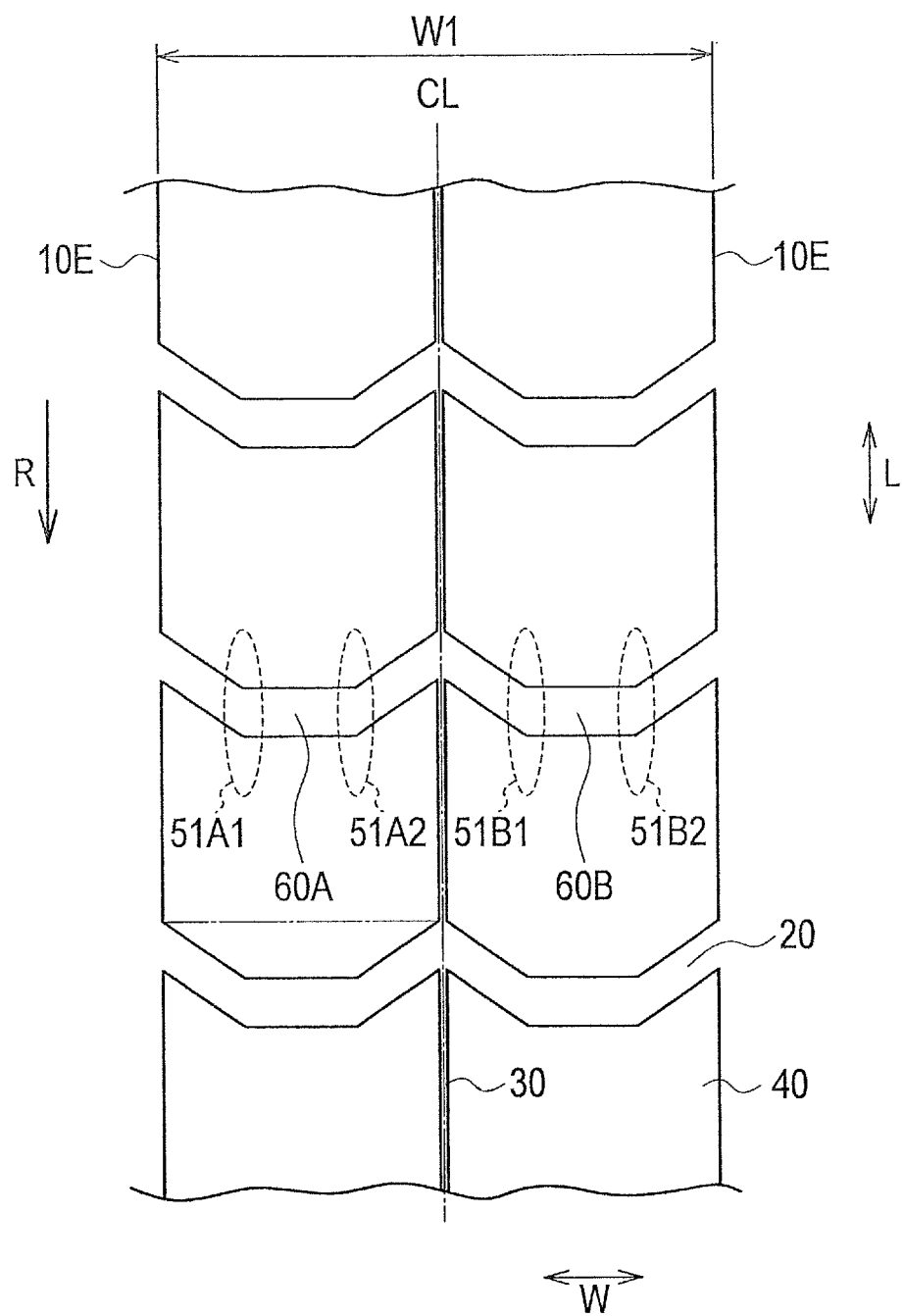
FIG. 6 is a plan view of a part of a tread surface of a tire according to a second modified example.

Hereinafter, a tire 1 according to a modified example 2 of the first embodiment will be explained with reference to FIG. 6 by focusing on its differences from the above-explained tire according to the first embodiment.

In the tire 1 according to the present modified example 2, the width direction groove(s) 20 has at least two angled portions 51A1/51A2 (or 51B1/51B2) on at least one side of the tire equator line CL.

Here, the width direction groove(s) 20 has a flat portion 60A (or 60B) that is formed so as to be almost parallel to the tire width direction W between the two angled portions 51A1/51A2 (or 51B1/51B2).

According to the present modified example 2, the driving force is generated at an entire of the flat portion(s) 60A/60B, because the flat portion 60A (or 60B) is provided between the two angled portions 51A1/51A2 (or 51B1/51B2).

Note that, since it is assumed, in an actual tire 1, that there is a case where it is needed to generate the driving force to some extent, formation of the flat portion(s) 60A/60B is conductive to performance improvements of the tire 1 in such a case.

Modified Example 3

Hereinafter, a tire 1 according to a modified example 3 of the first embodiment will be explained with reference to FIG. 7 by focusing on its differences from the above-explained tire according to the first embodiment.

Figure 7:
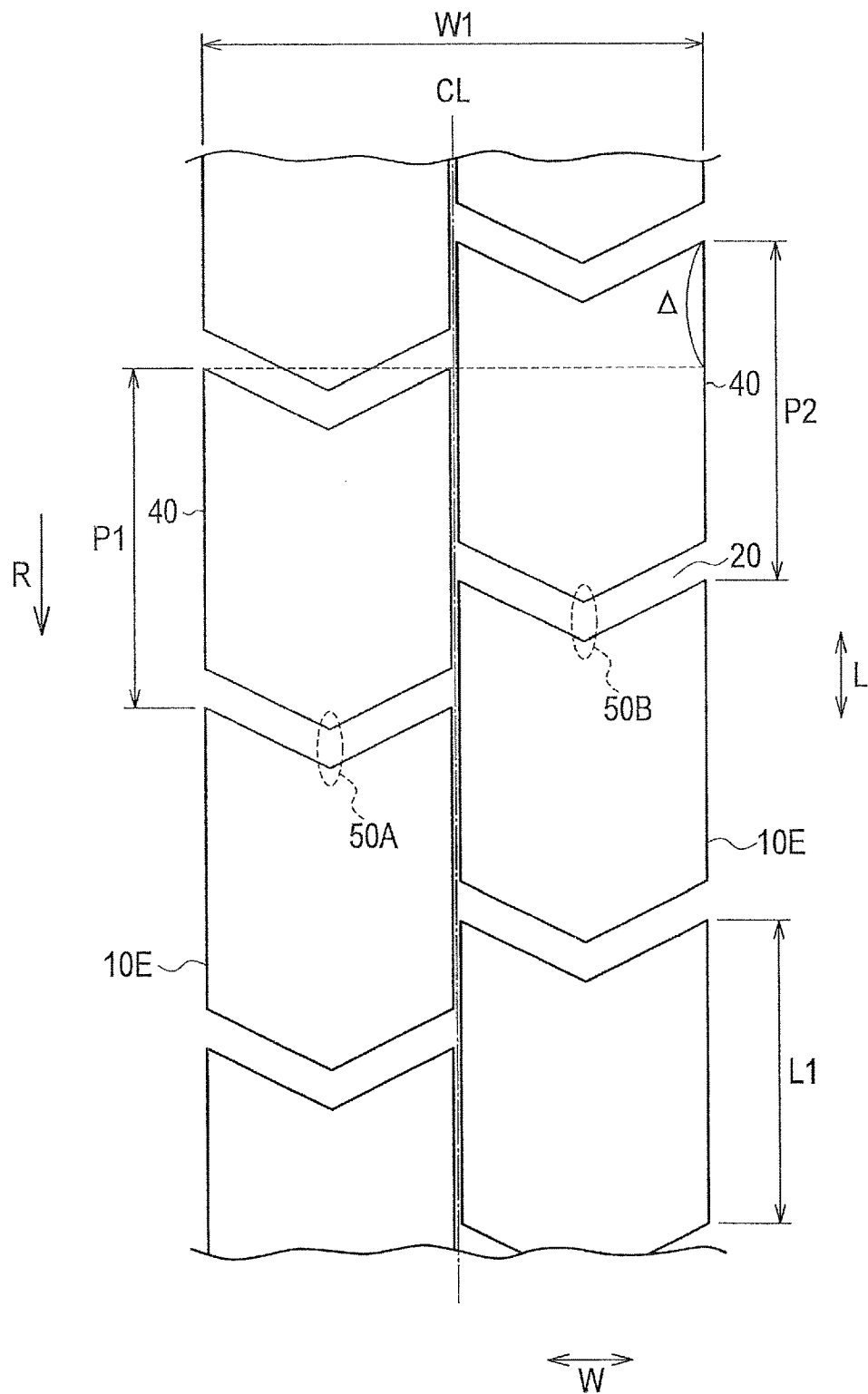
FIG. 7 is a plan view of a part of a tread surface of a tire according to a third modified example.

As shown in FIG. 7, in the tire 1 according to the modified example 3 of the first embodiment, the width direction groove(s) 20 is configured so as to be discontinued on the tire equator line CL.

Namely, in the tire 1 according to the modified example 3 of the first embodiment, pitches P1/P2 of the land portions 40 disposed on both sides of the tire equator line CL may be configured so as not to be coincide with each other.

For example, it is probable that an offset amount Δ of the pitches P1/P2 is not larger than 20% of a length L1 of the land portion(s) 40 along the tire circumferential direction L.

According to the tire 1 in the modified example 3 of the first embodiment, stiffness in the tire circumferential direction L can be equalized.

Modified Example 4

Hereinafter, a tire 1 according to a modified example 4 of the first embodiment will be explained with reference to FIG. 8 by focusing on its differences from the above-explained tire according to the first embodiment.

Figure 8:
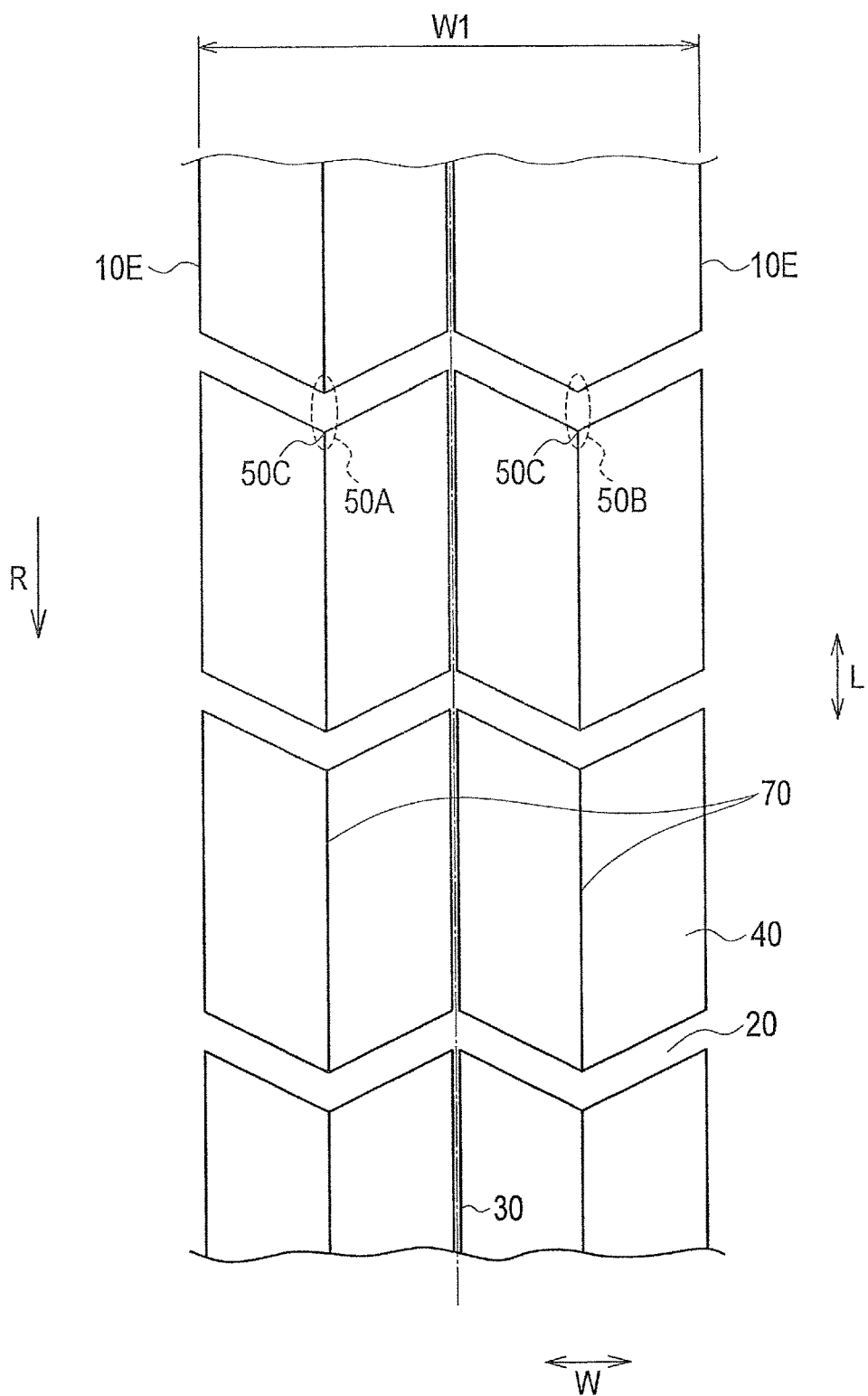
FIG. 8 is a plan view of a part of a tread surface of a tire according to a fourth modified example.

As shown in FIG. 8, in the tire 1 according to the modified example 4 of the first embodiment, a circumferential direction narrow groove 70 is formed in the land portion(s) 40 along the tire circumferential direction L in view of moldability upon vulcanization.

For example, in the land portion(s) 40, the circumferential direction narrow groove 70 may be formed in an area whose length from the tire equator line CL to its outside in the tire width direction is 0.55 L to 0.70 L. Here, the "L" is a length of the land portion(s) 40 along the tire width direction.

Note that the circumferential direction narrow groove 70 may be configured so as to intersect with the vertex 50C of the angled portion(s) 50A/50B (or with the area peripheral to the vertex 50C) and to extend in the tire circumferential direction L.

Modified Example 5

Hereinafter, a tire 1 according to a modified example 5 of the first embodiment will be explained with reference to FIG. 9 by focusing on its differences from the above-explained tire according to the first embodiment.

Figure 9:
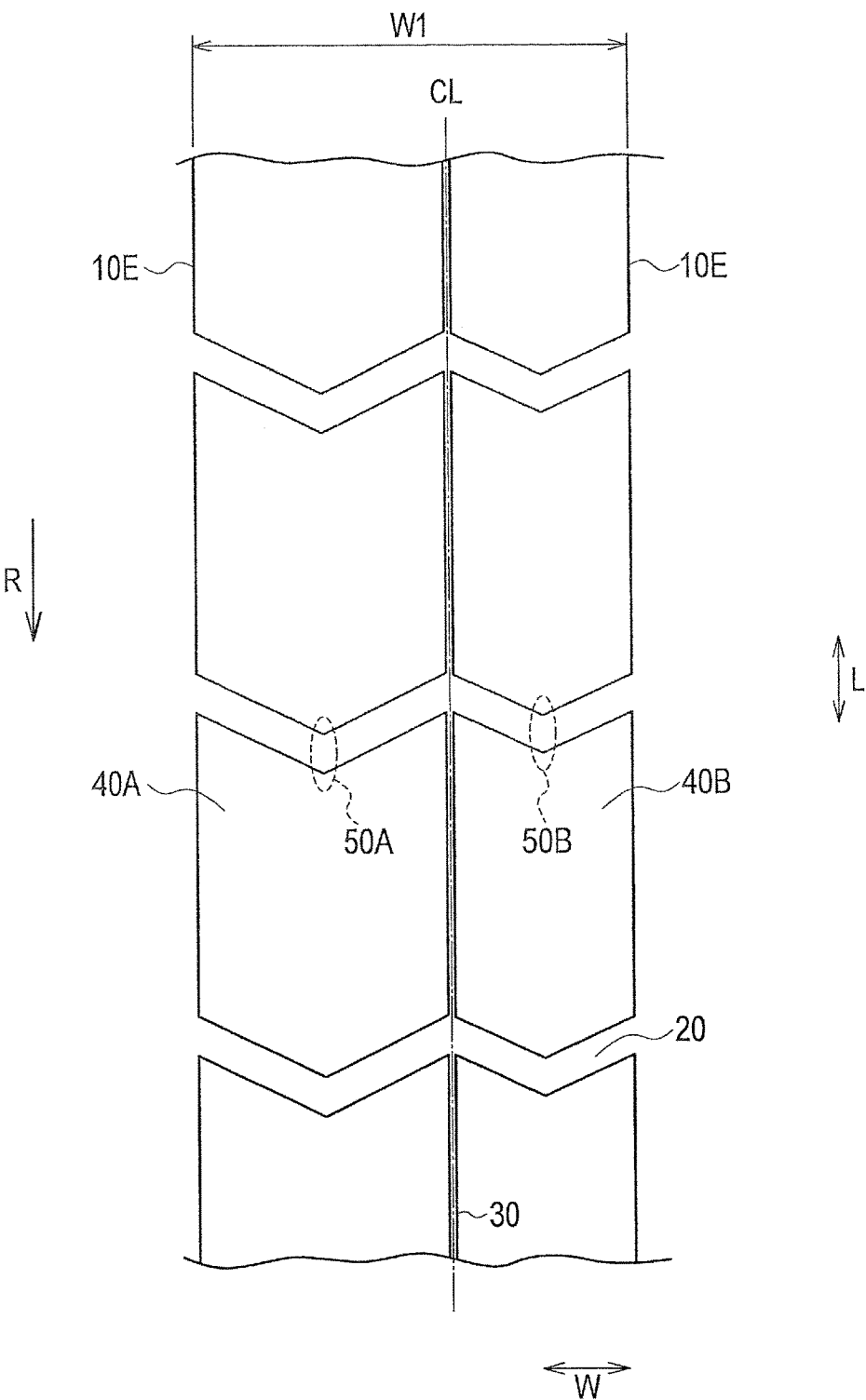
FIG. 9 is a plan view of a part of a tread surface of a tire according to a fifth modified example.

As shown in FIG. 9, in the tire 1 according to the modified example 5 of the first embodiment, the land portions 40A/40B disposed on both sides of the tire equator line CL may be configured so as to have different shapes from each other.

For example, as shown in FIG. 9, in the tire 1 according to the modified example 5 of the first embodiment, widths (lengths along the tire width direction W) of the land portions 40A/40B disposed on both sides of the tire equator line CL may be configured so as to be different from each other.

As shown in FIG. 9, a ratio of the width of the land portion(s) 40A/40B disposed on one side of the tire equator line CL and the width of the land portion(s) 40 disposed on another side of the tire equator line CL may be in a range 6:4 to 9:1.

Namely, in the tire 1 according to the modified example 5 of the first embodiment, a pattern of the land portions 40A on the left side and a pattern of the land portions 40B on the right side is not line-symmetric with respect to the tire equator line.

The tire 1 according to the modified example 5 of the first embodiment is effective, when setting a camber angle, in a case where inputs to the tread surface of the tire 1 are different from each other in the tire width direction W.

Modified Example 6

Hereinafter, a tire 1 according to a modified example 6 of the first embodiment will be explained with reference to FIG. 10 by focusing on its differences from the above-explained tire according to the first embodiment.

In the tire 1 according to the modified example 6, the width direction groove(s) 20 has two angled portions 51A1/51A2 on the left side of the tire equator line CL, and has two angled portions 51B1/51B2 on the right side of the tire equator line CL.

Here, the width direction groove(s) 20 has a flat portion 60A (or 60B) that is formed so as to be almost parallel to the tire width direction W between the two angled portions 51A1/51A2 (or 51B1/51B2).

In addition, in the tire 1 according to the modified example 6, the circumferential direction narrow groove 70A that intersects with the flat portion 60A and extends in the tire circumferential direction L is formed on the left side of the tire equator line CL, and the circumferential direction narrow groove 70B that intersects with the flat portion 60B and extends in the tire circumferential direction L is formed on the right side of the tire equator line CL.

Figure 10:
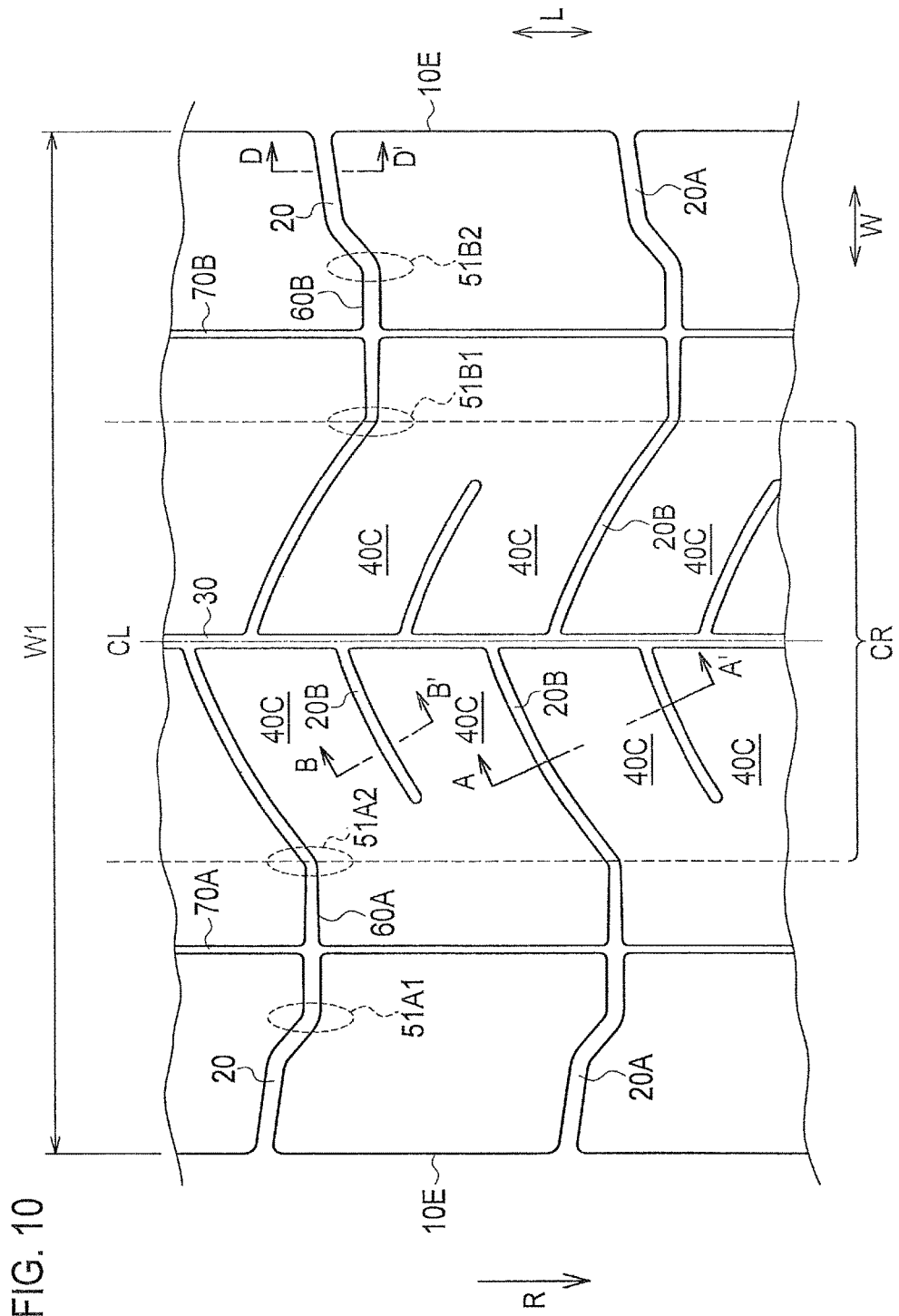
FIG. 10 is a plan view of a part of a tread surface of a tire according to a sixth modified example.
Figure 12:
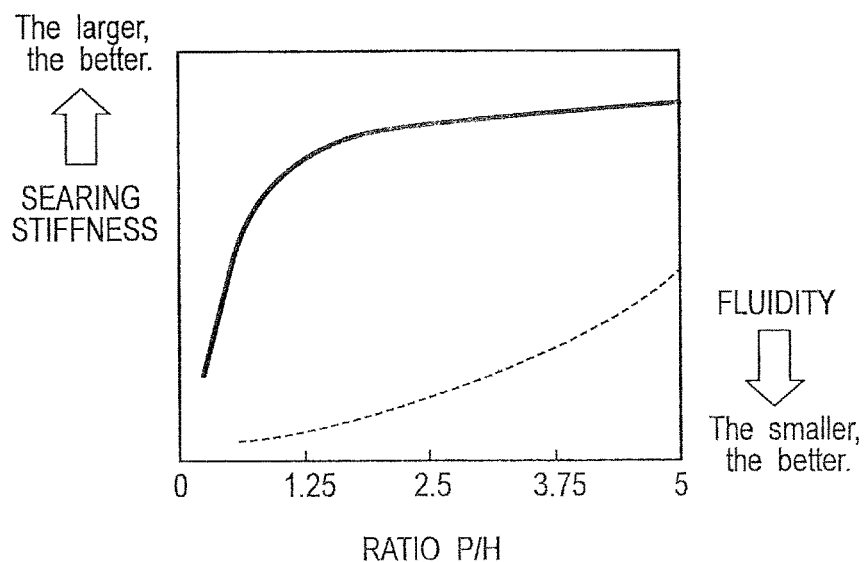
FIG. 12 is a chart showing relations between a ratio P/H with respect to a dimension of a central land portion 40C, and shear stiffness of the central land portion 40C and rubber fluidity of the central land portion 40C.

As shown in FIG. 10, the circumferential direction groove 30 is a central circumferential direction groove extending on the tire equator line CL along the tire circumferential direction. The width direction groove(s) 20 having the angled portion 50A (or the angled portion 50B) extends from the end portion 10E of the tread portion 10 in the tire width direction W to the circumferential direction groove 30 (the central circumferential direction groove).

The plural land portions 40 include central land portions 40C that are formed in a tread center area CR including the tire equator line CL as the center in the tire width direction W. The tread center area CR has a width that is not larger than 40% of the length W1 of the tread portion 10 in the tire width direction W. A ratio P/H of a length P of the central land portion(s) 40C in the tire circumferential direction L and a height H of the central land portion(s) 40C in the tire radial direction is not smaller than 2 and not larger than 3.5.

The height H of the central land portion(s) 40C in the tire radial direction is, as shown in FIG. 11(a), a distance in the tire radial direction between the deepest portion of the width direction groove 20 (here, the second groove 20B) that segments the land portions 40 and the most outer portion of the central land portion 40C in the tire radial direction. In a case where a depth of the width direction groove 20 (here, the second groove 20B) varies, the height H of the central land portion 400 is the distance in the tire radial direction between its deepest portion and its most outer portion.

The length P of the central land portion 40C in the tire circumferential direction L is a length of the central land portion 40C in the tire circumferential direction, i.e. an averaged value of a distance in the tire circumferential direction L between the two width direction grooves 20 (here, the second grooves 20B) that interpose the central land portion 40C therebetween. For example, the averaged value is an averaged value of calculated distances in the tire circumferential direction L between the two width direction grooves 20 (here, the second grooves 20B) with respect to an entire of the central land portion 40C.

Since the ratio P/H is in a range not smaller than 2 and not larger than 3.5 as explained above, rubber fluidity of the central land portion(s) 40C can be reduced in a tread center portion that brings a large tagger effect while ensuring shearing stiffness of the central land portion(s) 40C, and uneven wears to be generated between the tread center portion and a tread shoulder portion can be restricted by restricting wears in the tread center portion.

Namely, as showing relations between the ratio P/H with respect to a dimension of the central land portion 40C and the shear stiffness (indicated by a solid line) of the central land portion 40C and the rubber fluidity (indicated by a dotted line) of the central land portion 40C, when the length P of the central land portion 40C along the tire circumferential direction L is too small to the height H of the central land portion 40C, the shear stiffness of the central land portion 40C reduces drastically, and thereby driving shearing deformation increases drastically. On the other hand, when the length P of the central land portion 40C along the tire circumferential direction L is too large to the height H of the central land portion 400, the rubber fluidity becomes large excessively, and thereby the driving shearing deformation increases.

In addition, when the ratio P/H is in the range not smaller than 2 and not larger than 3.5 in areas outside the tread center area CR in the tire width direction W, a breaking state is subject to occur at a so-called ¼ point (a center point of a tread half width in the width direction) and vicinity thereof. Note that the "breaking stat" is a state opposite to a "driving state", and a state of a tire in breaking where tread deformation is in a state where a tier inner surface side is sheared forward and a tread surface is sheared backward.

Here, the width direction grooves 20 include a first groove(s) 20A extending from the end portion 10E of the tread portion 10 in the tire width direction W toward an inside of the tire width direction W, and a second groove(s) 20B formed in at least part of the tread center area. A depth h1 of the second groove(s) 20B in the tire radial direction is not larger than 80% of a depth h2 of the first groove (s) 20A in the tire radial direction. The depth h1 of the second groove(s) 20B denotes the maximum depth of the second groove(s) 20B as shown in FIG. 11(b). In addition, the depth h2 of the first groove(s) 20A denotes the maximum depth of the first groove(s) 20A as shown in FIG. 11(c).

(Experiment Results 1)

Results of an experiment that was made with tires according to a comparative example 1 and a practical example 1 in order to confirm advantages of the first embodiment will be explained. Note that the present invention is not limited by these examples.

In this experiment, a radial tire provided with the width direction groove(s) 20 that has the angled portions 50A/50B and shown in FIG. 3 is used as a tire according to the practical example 1, and a radial tire without the width direction groove(s) 20 that has the angled portions 50A/50B is used as a tire according to the comparative example 1.

In addition, in this experiment, sizes of all the radial tires are set to "tire size 46/90R57". In addition, in this experiment, wearing energies at the tire width direction positions A shown in FIG. 1 are measured by using measurement instruments disclosed in Japanese Patent Application Publication No. H7-63658 under a condition where a speed is 50 mm/s, a load is 3.5 kN, and an inner pressure is 0.19 MPa. Here, a rim width used in this experiment is 5-J×14 (standard size in the JATMA Standards).

According to the experiment results, the tire according the practical example 1 provided with the configuration of the first embodiment can reduces the wearing energy by almost 20% lower than the tire according to the comparative example 1.

(Experiment Results 2)

Results of an experiment that was made with tires according to comparative examples 2 and 3 and practical examples 2 to 4 in order to confirm advantages of the modified example 6 will be explained. The tires according to the comparative examples 2 and 3 and the practical examples 2 to 4 have a tread pattern shown in FIG. 10, and are provided with an identical configuration excluding the ratios P/H. The ratios P/H are shown in Table 1.

The above-explained tires having the tire size 46/90R57 are mounted onto the applied rim and installed to a drive wheel(s) of a vehicle, and then experiments for measuring wearing energies at a center portion (on the central land portion 40C right beside the circumferential direction groove 30) were made after applying the inner pressure regulated in the JATMA Standards and so on and the regulated load.

The wearing energies were measured by the measurement instrument for a tire tread surface disclosed in the Japanese Patent Application Publication No. H7-63658.

Figure 13:
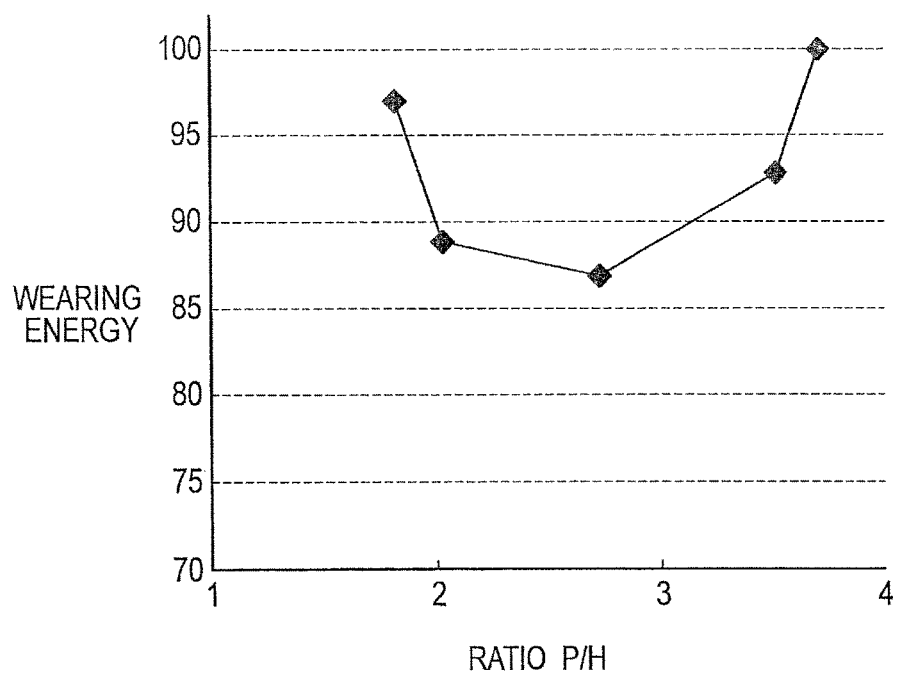
FIG. 13 is a chart showing a relation between the ratio P/H and wearing energy.

Evaluation results are shown in Table 1 and FIG. 13. Note that, in Table 1 and FIG. 13, the wearing energies are indicated by relative values when the comparative example 2 is denoted as 100, and they indicate that wears at the center portion are reduced when the values are small.

TABLE 1

|  | Practical Example 2 | Practical Example 3 | Practical Example 4 | Comparative Example 2 | Comparative Example 3 |
|---|---|---|---|---|---|
| Ratio P/H | 2 | 2.7 | 3.5 | 1.8 | 3.7 |
| Wearing Energy (INDEX) | 89 | 87 | 93 | 97 | 100 |

As shown in Table 1 and FIG. 13, it is known that the wearing energies are dominantly reduced further in the practical examples 2 to 4 of which the ratios P/H are in an appropriate range than in the comparative examples 2 and 3.

(Experiment Results 3)

Results of an experiment that was made with tires according to practical examples 5 and 6 in order to confirm advantages of the modified example 6 will be explained.

The tires according to the practical examples 5 and 6 are identical to the tire according to the practical example 3 excluding a ratio h1/h2. The ratios h1/h2 are shown in Table 2.

The tires according to the practical examples 5 and 6 are mounted onto the applied rim and installed to a drive wheel(s) of a vehicle, and then the tread surfaces of the tires were observed after applying an inner pressure regulated in the JATMA Standards and so on and a regulated load and then running for 4000 hours, so that it was confirmed that the second grooves 20B remained in the tread center area CR in the practical example 5 but the second grooves 20B disappeared in the practical example 6.

Subsequently, the tires according to the practical examples 5 and 6 were further run for more 4000 hours, and then it was evaluated whether tear-offs of the tread occur or not.

As the evaluation results shown in Table 2 present, it is known that the practical example 6 of which the ratio h1/h2 is in an appropriate range is superior in anti-cutoff performance to the practical example 5.

TABLE 2

|  | Practical Example 5 | Practical Example 6 |
|---|---|---|
| h1 (mm) | 60 | 55 |
| h2 (mm) | 70 | 70 |
| h1/h2 | 86% | 79% |
| Anti-Cutoff Performance | Tear-offs exists. | No tear-off exists. |

Although the present invention is explained by using the above embodiment as described above, it is apparent to a person having ordinary skill in the art that the present invention is not limited to the embodiment explained in this Description. The present invention can be revised within a purport and a scope of the present invention determined by descriptions of Claims and can be carried out as its modified embodiment. Therefore, the descriptions of the Description are made as exemplary examples, and have no signification that limits the prevent invention.

Note that all contents of Japanese Patent Application No. 2012-093008 (filed on Apr. 16, 2012) and Japanese Patent Application No. 2012-093094 (filed on Apr. 16, 2012) are incorporated into this Description by reference.

INDUSTRIAL APPLICABILITY

According to the present invention, it is possible to provide a tire that can reduce a shearing force generated between an area near a tire equator line CL and an area near an end portion in a tire width direction W.

The invention claimed is:

1. A tire comprising:
a plurality of land portions formed on a tread portion, wherein
the plurality of land portions is segmented by one or more circumferential direction grooves extending in a tire circumferential direction and width direction grooves extending in a tire width direction, and an end portion of the tread portion in the tire width direction,
a length of the width direction grooves in the tire width direction is not less than 30% of a length of the tread portion in the tire width direction,
each of the width direction grooves has an angled portion configured to be bent so that both ends of each of the width direction grooves are directed toward an opposite direction to a tire rotational direction,
the one or more circumferential direction grooves include a central circumferential direction groove extending on the tire equator line along the tire circumferential direction,
each of the width direction grooves having the angled portion extends from the end portion of the tread portion in the tire width direction to the central circumferential direction groove,
the plurality of land portions includes central land portions that are formed in a tread center area including the tire equator line as a center in the tire width direction,
the tread center area has a width that is not larger than 40% of the length of the tread portion in the tire width direction, and
a ratio P/H of a length P of the central land portions in the tire circumferential direction and a height H of the central land portions in a tire radial direction is not smaller than 2 and not larger than 3.5; and
a plurality of belt plies, wherein
the angled portion is disposed near a tire width direction position that is associated with an end portion of a belt ply that has the smallest angle between cords constructing the belt ply and the tire circumferential direction,
the belt ply having the smallest angle between cords and the tire circumferential direction is disposed below a belt layer having a larger angle between cords and the tire circumferential direction than the smallest angle,
wherein the tire is a heavy load tire comprising three belt plys, each belt ply including two belt layers,
an upper belt ply and a middle belt ply of the three belt plys have a cord angle that is larger than a lower belt ply of the three belt plys, and
the upper belt ply and the middle belt ply extend outward of a position located about ¼ of the width of the tread portion from the tire equator line.

2. The tire according to claim 1, wherein
each of the width direction grooves include a first groove extending from the end portion of the tread portion in the tire width direction toward an inside of the tire width direction, and a second groove formed in at least part of the tread center area, and
a depth h1 of the second groove in the tire radial direction is not larger than 80% of a depth h2 of the first groove in the tire radial direction.

3. The tire according to claim 1, wherein
each of the width direction grooves has at least two angled portions on at least one side of the tire equator line, and
each of the width direction grooves has a flat portion that is formed so as to be approximately parallel to the tire width direction between the two angled portions.

4. The tire according to claim 3, wherein
a circumferential direction narrow groove that intersects with the flat portion and extends along the tire circumferential direction is provided.

5. The tire according to claim 4, wherein a groove width of the flat portion becomes wider in a direction moving away from the tire equator line.

6. The tire according to claim 3, wherein an inside angled portion, which one of the angled portions closer to the tire equator line, is formed only by an inclined groove segment and the flat portion.

7. The tire according to claim 1, wherein each of the width direction grooves terminating at the central circumferential groove are disposed in a staggered pattern such that a width direction groove on one side of the tire equator line is offset from a width direction groove on another side of the tire equator line.

* * * * *